Figure 1:
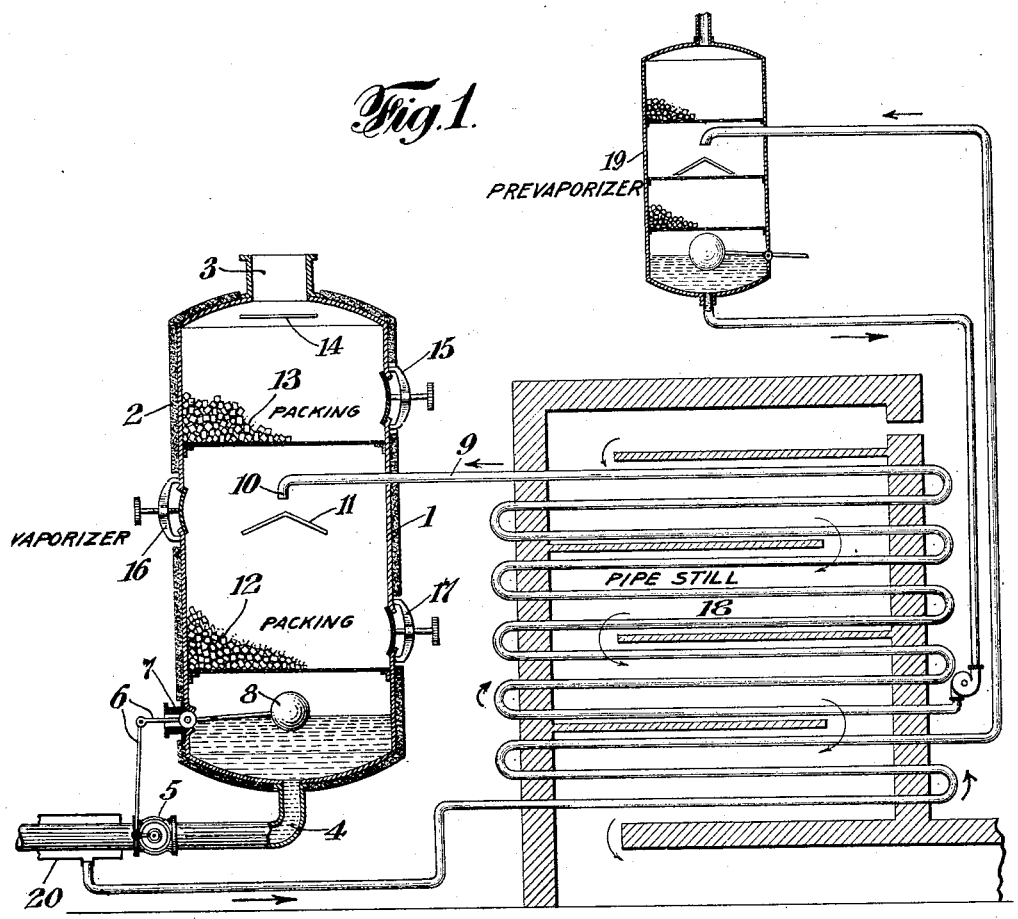

Patented June 2, 1931

1,808,419

UNITED STATES PATENT OFFICE

EUGENE H. LESLIE AND EDWIN M. BAKER, OF ANN ARBOR, MICHIGAN

VAPORIZER AND PROCESS OF VAPORIZATION

Application filed March 20, 1923. Serial No. 626,273.

This invention relates to a vaporizer and process of vaporization, and more particularly to a vaporizer and process of vaporization in which a substantially sharp and clean separation of a liquid and a vapor resulting from a partially vaporized liquid, may be attained.

This invention has as an object the separation by vaporization from a composite liquid, a vapor of desired composition, in a simple, clean, and sharp manner.

This invention is designed to be applicable to the vaporization of a part of a composite liquid, which part is, or approximates thereto, the equilibrium vapor of the system at any given temperature. The invention is applicable to the treatment of liquids which contain constituents that are either miscible or immiscible with each other, or liquids which may or may not form constant boiling mixtures upon vaporization.

As a specific example of the manner in which this invention may be applied, the treatment of a hydrocarbon mixture will be described, it being understood that the procedure is applicable to other liquids in the general manner above set forth.

In treating a liquid mixture or solution such as petroleum, it is desirable to separate therefrom a volatile portion, that may contain the gasoline, kerosene and gas oil. It is furthermore desirable to accomplish this in a simple and economical manner and yet achieve a sharp and rapid separation in an effective manner. It is important and advantageous to bring the liquids and vapors to a state of equilibrium as rapidly as possible, and it is a fundamental feature of our invention to provide an apparatus and process to achieve such a result. The separation of liquid and vapor should be clean and sharp, for if this is not the case, extra work of separation will necessarily be done on either or both the vapor and liquid. The entire fluid system in the vaporizer should approach a state of equilibrium, as to composition and temperature, with some reasonable and practical degree of approximation. The present apparatus and method are designed to enable a liquid mixture and its vapor to arrive at a state of equilibrium in a short time. Equilibrium is that condition which is independent of the further passage of time. It is desirable to approximate as nearly as possible to the equilibrium condition, since it is the one at which the maximum quantity of vapor will be formed for any initial heat content of the system, and in which compositions of vapor and liquid are mutually and definitely related. The maximum change in composition in passing from the initial to the final state of a system undergoing a process of vapor formation is that attained when the final state is one of equilibrium between vapor formed and liquid residue.

In the example given, of treating petroleum to obtain a volatile fraction of some desired composition, a separation may be obtained by a single vaporization operation, and in such a case, the maximum yield and sharpest separation would be obtained if the desired vapor were the vapor phase existent when the system was in equilibrium. Furthermore, under equilibrium conditions the minimum quantity of the less volatile components of petroleum would be contained in the vaporized portion. Hence for reasons of heat economy, and for uniformity and certainty of operation, equilibrium conditions should be approached as nearly as possible.

In order to obtain equilibrium in any reasonable length of time in a system composed of liquid and vapor, the liquid must be spread over a large surface. Opportunity is thus afforded for the ready formation of vapor, and the liquid and vapor coexist in intimate contact. In the embodiment of our invention now to be described, there is provided a large liquid surface whereby intimate contact is obtained.

Figure 2:
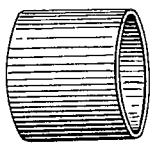

In the annexed drawings which form part of this specification there is shown in Figure 1 a combination of a vaporizer designed to function as set forth above, and a pipe-still to heat the liquid for the vaporizer; Figure 2 shows a unit of the packing material suitable for use in the vaporizer.

In said drawings there is shown a vertical cylindrical vaporizer 1 provided on its outside surfaces with a lagging 2 to act as a heat insulating material and this vaporizer is provided at its top with a vapor exit 3 and at its bottom with a liquid exit 4 containing a balance valve 5 operated by a rod or mechanism 6 passing through a stuffing box 7 and connected to a float 8 arranged as shown. This float will control the amount of residuum remaining in the vaporizer and thereby provide a liquid seal for the apparatus. Hot liquid is supplied to the vaporizer through a pipe 9 having a downwardly turned portion 10 arranged to deliver the liquid onto a baffle 11. Beneath this baffle and the said pipe 9 is a zone of packing material 12, and above the said pipe and baffle is another and preferably similar zone of packing material 13. Above the latter is placed a baffle 14 to prevent the vapors passing in too great quantity through the center of the cylinder to the exclusion of the outer portion of the packing. Suitably positioned manholes 15, 16 and 17 are provided to gain access to the interior of the vaporizer.

The baffle 11 may be conical in form and is preferably made of cast iron rather than steel because cast iron, particularly if it contains a fairly large proportion of cementite, is much more resistant than steel to the effect of oil and similar substances, and to the corrosion resulting apparently from the presence of acid formed by the hydrolysis of the salts in the water emulsified with crude oil when the latter is used.

In Figure 2 a unit of packing material is shown in the form of a ring packing. A zone, such as zone 12, may be formed of a ring packing composed of a large number of units such as shown in Figure 2. These packings are merely thrown into the vaporizer without regard to the particular arrangement of the units. The unit or ring packing material such as shown consists of a cylinder whose diameter and length are approximately equal, and may be advantageously one inch in diameter and one inch long. Such a packing when filled into a space or zone without special placing offers 60 to 65 square feet of surface per cubic foot of space occupied by the packing with a resulting free space of over 90% if the rings are made from a heavy sheet metal. Even if other packing material is used or if ring packing material of different sizes is used, it is desirable to have the free space over 60%. It is also desirable to make the packing of cast iron, and in order that the walls of such packing shall be very thin, it is desirable to use a high phosphorus iron cast by machine. Such a packing will be resistant to corrosion and abrasion but it will be brittle and should therefore be supported in sections in the vaporizer if zones more than two or three feet deep are required.

The vaporizer is shown in combination with a pipe-still 18 built in a manner known in this art, and this still may be provided with a prevaporizer 19 similar in structure to the above described main vaporizer. The purpose of this prevaporizer is to vaporize the lightest hydrocarbons and all or a part of the water and to eliminate dissolved gases before the oil or other liquid completes its passage through the main heater; which in this case is the pipe still, and is discharged into the vaporizer. If these vapors and gases are not removed they form in the pipe still and reduce the rate of heat transfer therein. Gases and vapors are very poor conductors of heat and offer the main resistance to heat flow in any heat transfer apparatus in which they are present. The prevaporizer while desirable is not absolutely essential. The incoming liquid or crude oil may be made to pass through heat exchangers 20 on the way to the pipe still, these heat exchangers being heated by the residuum from the main vaporizer 1.

The operation of the apparatus is as follows when petroleum is the liquid which is being operated upon: The petroleum enters the system through the heat exchangers and is heated to any desired temperature in the pipe still, the prevaporizer being used or not as desired. The temperature to which the oil is heated may be from 400 to 500° F. and the time of heating 3 to 5 minutes. The oil is thus superheated with respect to its content of relatively volatile constituents such as gasoline, kerosene, etc. Upon emerging from the portion 10 of the pipe 9, the heat contained in the oil will cause vaporization of the more volatile constituents, and the amount of vaporization obtained will of course depend on the degree of temperature to which the oil is heated in the pipe-still. The oil flows down in the main packing zone 12 and flows over the extended surfaces provided by the ring packing, as a result of which a state of equilibrium between the vapor and liquid is rapidly attained. The release of pressure on the oil upon its delivery from the pipe still into the vaporizing chamber causes the more volatile constituents to flash off, and the enormous filming surface provided by the packing, together with the large percentage of free vapor space which it affords at the same time, greatly enhances the speed at which the vapors flash off and the attainment of equilibrium between the residual liquid oil and the flashed-off vapors. The liquid passes down to the bottom of the apparatus and the vapor rises to the packing zone 13 and is brought into contact with the extensive surfaces therein provided, as a result of which liquid droplets entrained in the vapor are effectively removed and returned downwards to join the body of the liquid. The resulting vapors pass out through the top of the apparatus and may be further treated or collected as desired. It will be seen that the use of a pipe still in conjunction with a vaporizer of the character hereindescribed makes it possible to deliver to the mass of packing in the vaporizing chamber a continuous and rapid feed of superheated oil under accurately controlled temperature and other operating conditions. The employment of the pre-vaporizer 19 is advantageous not only for the reasons already stated but also because removal of the extremely volatile components of the oil prior to attainment of the full superheating temperature in the pipe still avoids excessively high pressures in the pipe still.

It will be noted that the vaporizer 1 is unheated, except by the heat introduced with the oil treated, so that temperature differences in the vaporizer, which might hinder the attainment of substantial equilibrium, are reduced to a minimum. Further, the vaporizer 1 is normally closed except for the liquid delivery pipe and vapor and liquid exits and no gases other than vapors from the oil treated are introduced therein. Such gases, if present, would tend to hinder the attainment of substantial equilibrium by lowering the pressure of the oil vapors and thereby increasing vaporization and also by producing a gaseous phase within the vaporizer differing widely in composition in different parts thereof.

As many apparently widely different embodiments of this invention may be made without departing from the spirit thereof, it is understood that we do not limit ourselves to any embodiments except as defined in the following claims.

What we claim is:—

1. In apparatus for the treatment of mineral oils the combination of heating means, a vaporizing chamber into which said heating means is arranged to deliver heated oil, a mass of packing material arranged below the liquid inlet in said chamber and providing extensive filming surfaces for rapidly attaining equilibrium between said liquid and the vapor flashed therefrom, said chamber being provided with outlets for exit of vapors and liquid, and means cooperating with said heating means for removing components more volatile than gasoline before the main body of oil is delivered into said vaporizing chamber.

2. In apparatus for the treatment of mineral oils the combination of a pipe still, a vaporizing chamber into which said pipe still is arranged to deliver heated liquid, a mass of packing material arranged below the liquid entrance in said chamber and providing extensive filming surfaces for rapidly attaining equilibrium between said liquid and the vapor flashed therefrom, and a flash vaporizer for removing components more volatile than gasoline before the main body of oil is delivered into said vaporizing chamber.

3. Apparatus of the character described comprising the combination, with a pipe still, of means interposed between the intake and discharge of said pipe still whereby a preliminary separation of light vapors from liquid may be effected, a vaporizing chamber into which said pipe still is arranged to deliver heated liquid, and a mass of packing material arranged below the liquid inlet in said chamber and providing extensive filming surfaces for rapidly attaining equilibrium between said liquid and the vapor flashed therefrom.

4. The process of obtaining valuable products from a petroleum oil, which comprises initially heating a petroleum oil to substantially eliminate therefrom components more volatile than gasoline, superheating the residual oil in a pipe still to a temperature insufficient to cause cracking, discharging the superheated oil upon a mass of packing affording extensive filming surface and also providing a large percentage of its volume as free space for vapor, whereby relatively volatile constituents of said oil are flashed off and equilibrium between the resultant vapors and liquid is rapidly established, and separately conducting away said vapors and liquids.

5. The process of separating from a mineral oil a relatively volatile portion thereof, which comprises heating said oil, in a pipe still, and before completion of the heating operation removing heat-insulating gases by distributing the preliminarily heated oil over a packing to flash off light products, distributing the completely heated oil delivered from the pipe still over a liquid-vapor contacting packing to rapidly attain equilibrium between the hot liquid oil and the vapor flashed therefrom, and further conducting the volatilized portion through packing for the removal of entrained liquid.

6. The process claimed in claim 5 in which the mineral oil is superheated in the pipe still and is fed therefrom in a continuous stream upon the said packing.

In testimony that we claim the foregoing, we have hereunto set our hands this 8th day of March, 1923.

EUGENE H. LESLIE.
EDWIN M. BAKER.